(12) United States Patent
Spenninger

(10) Patent No.: US 12,296,489 B2
(45) Date of Patent: May 13, 2025

(54) CONTROL OF A ROBOT MANIPULATOR UPON CONTACT WITH A PERSON

(71) Applicant: Franka Emika GmbH, Munich (DE)

(72) Inventor: Andreas Spenninger, Karlsfeld (DE)

(73) Assignee: Franka Emika GmbH, Munich (DE)

( * ) Notice: Subject to any disclaimer, the term of this patent is extended or adjusted under 35 U.S.C. 154(b) by 224 days.

(21) Appl. No.: 17/794,433

(22) PCT Filed: Feb. 10, 2021

(86) PCT No.: PCT/EP2021/053124
§ 371 (c)(1),
(2) Date: Jul. 21, 2022

(87) PCT Pub. No.: WO2021/165105
PCT Pub. Date: Aug. 26, 2021

(65) Prior Publication Data
US 2023/0067761 A1 Mar. 2, 2023

(30) Foreign Application Priority Data
Feb. 19, 2020 (DE) ...................... 10 2020 104 364.3

(51) Int. Cl.
*B25J 13/08* (2006.01)
*B25J 9/16* (2006.01)

(52) U.S. Cl.
CPC .......... *B25J 9/1676* (2013.01); *B25J 9/1633* (2013.01); *B25J 9/1653* (2013.01); *B25J 13/089* (2013.01)

(58) Field of Classification Search
CPC ...... B25J 9/1676; B25J 9/1653; B25J 9/1633; B25J 13/089
See application file for complete search history.

(56) References Cited

U.S. PATENT DOCUMENTS

| 5,347,459 A | 9/1994 | Greenspan et al. |
| 9,266,240 B2 * | 2/2016 | Shiraki ................... G05B 9/02 |

(Continued)

FOREIGN PATENT DOCUMENTS

| DE | 102007060680 A1 | 6/2009 |
| DE | 102011111758 A1 | 2/2013 |

(Continued)

OTHER PUBLICATIONS

English-language translation of International Preliminary Report on Patentability issued in International Application No. PCT/EP2021/053124 on Sep. 1, 2022.
Navarro, Benjamin, et al., "An ISO10218-compliant adaptive damping controller for safe physical human-robot interaction", 2016 IEEE International Conference on Robotics and Automation (ICRA), IEEE, May 16, 2016, pp. 3043-3048.

(Continued)

*Primary Examiner* — Dalena Tran
(74) *Attorney, Agent, or Firm* — Hoffmann & Baron, LLP

(57) ABSTRACT

A method of controlling a robot manipulator, the method including: providing a database containing body zones of a person, wherein each of the body zones is assigned a respective maximum permissible value of contact pressure value, determining a current or a future contact event of the robot manipulator involving the person, and determining a body zone of the person that is contacted, determining a reference position fixed relative to a body of the person, wherein the reference position indicates beginning of a spatial progression of depression of tissue of the person during the contact event with the person, and controlling the robot manipulator in an impedance-regulated manner, such that the reference position serves as a zero position of an artificial spring component of impedance regulation of the robot manipulator and a maximum permissible contact pressure is not exceeded as a limit value.

18 Claims, 1 Drawing Sheet

(56) References Cited

U.S. PATENT DOCUMENTS

| | | | |
|---|---|---|---|
| 2002/0062177 A1* | 5/2002 | Hannaford | G06F 3/016 |
| | | | 700/245 |
| 2006/0106495 A1* | 5/2006 | Takenaka | B62D 57/032 |
| | | | 700/253 |
| 2008/0077279 A1 | 3/2008 | Kato et al. | |
| 2008/0188985 A1 | 8/2008 | Sakano | |
| 2009/0171505 A1 | 7/2009 | Okazaki | |
| 2011/0270443 A1 | 11/2011 | Kamiya et al. | |
| 2014/0330432 A1* | 11/2014 | Simaan | B25J 9/1625 |
| | | | 700/250 |
| 2014/0379131 A1 | 12/2014 | Ryu et al. | |
| 2015/0019013 A1* | 1/2015 | Rose | B25J 13/08 |
| | | | 702/41 |
| 2015/0057798 A1 | 2/2015 | Meissner et al. | |
| 2015/0239124 A1 | 8/2015 | Haddadin et al. | |
| 2016/0176052 A1 | 6/2016 | Yamamoto | |
| 2017/0087722 A1 | 3/2017 | Aberg et al. | |
| 2017/0239815 A1 | 8/2017 | Haddadin | |
| 2018/0029228 A1 | 2/2018 | Haddadin | |
| 2019/0126475 A1 | 5/2019 | Kawanishi et al. | |

FOREIGN PATENT DOCUMENTS

| | | |
|---|---|---|
| DE | 102013212887 A1 | 4/2014 |
| DE | 102014114234 A1 | 3/2016 |
| DE | 102015016341 A1 | 6/2016 |
| DE | 102018112360 B3 | 9/2019 |
| JP | 2017-144492 A | 8/2017 |
| KR | 10-1976358 B1 | 8/2019 |

OTHER PUBLICATIONS

Decision of Rejection and English-language translation issued in Japanese Application No. JP 2022-549771 on Jul. 2, 2024.

Office Action an English-language translation issued in Japanese Application No. JP 2022-549771 on Nov. 10, 2023.

Cardenas, C.A. (Carlos), "Development of a Safety-Aware Intrinsically Passive Controller for Multi-DOF Manipulator", Robotics and Mechatronics, University of Twente, The Netherlands, Sep. 2017.

Office Action (and English-language translation) issued in KR 10-2022-7031799 on Jan. 16, 2025.

\* cited by examiner

CONTROL OF A ROBOT MANIPULATOR UPON CONTACT WITH A PERSON

CROSS-REFERENCE TO RELATED APPLICATIONS

The present application is the U.S. National Phase of PCT/EP2021/053124, filed on 10 Feb. 2021, which claims priority to German Patent Application No. 10 2020 104 364.3, filed on 19 Feb. 2020, the entire contents of which are incorporated herein by reference.

BACKGROUND

Field

The invention relates to a method of controlling a robot manipulator and a control unit to control a robot manipulator.

SUMMARY

The object of the invention is to improve the behavior of a robot manipulator in the event of a contact event between the robot manipulator and a person and, in particular, to make this behavior safer.

The invention results from the features of the independent claims. Advantageous refinements and embodiments are the subject matter of the dependent claims.

A first aspect of the invention relates to a method of controlling a robot manipulator, wherein the method includes:
  providing a database containing body zones of a person, wherein each of the body zones is assigned a respective maximum permissible value of contact pressure;
  determining a current or a future contact event of the robot manipulator involving the person, and determining a body zone of the person that is contacted;
  determining a reference position fixed relative to a body of the person, wherein the reference position indicates beginning of a spatial progression of the depression of a tissue of the person during the contact event with the person; and
  controlling the robot manipulator in an impedance-regulated manner, such that the reference position serves as a zero position of an artificial spring component of impedance regulation of the robot manipulator and a maximum permissible contact pressure is not exceeded as a limit value.

The body zones include, in particular, zones on the surface of the person's body, such as thighs, lower legs, hands, feet, abdomen, chest, upper back, lower back, face and/or portions of the face such as the eyes, nose, etc. Alternatively, body zones detached from these body parts are preferably used. The body zones as they are stored in the database are valid for people in general, so that they are not limited to a specific individual. In particular, however, when a certain group of people, such as children, come into contact with the robot manipulator, it is expedient to provide a special database with body zones specifically defined for that group of people.

Each of these body zones has an associated value according to the database, which indicates a maximum permissible contact pressure at the respective body zone. The contact pressure is defined, in particular, in the direction of a normal to the surface of the body zone. The contact pressure refers to the pressure that acts externally on the person's body. In principle, the terms contact pressure and contact force are interchangeable, since pressure is defined as a force per unit of area. In one embodiment, the term "contact pressure" is consistently replaced previously and in the following by the term "contact force". In addition to each value of the contact pressure, the database preferably has a respective value for a shearing stress as a tangential component of a force and/or a torque acting on the respective body zone.

The contact event is preferably determined by a prediction, in particular, by a simulation. This requires constant information about the pose of the robot manipulator, in particular, the future pose of the robot manipulator, and a pose of the person, in particular, a future pose of the person. In order to infer a future pose of the robot manipulator or the person from a current pose of the robot manipulator or the person, a predetermined target movement path of the robot manipulator and/or a speed and/or an acceleration of the robot manipulator is used, in particular, to predict the movement path of the robot manipulator. The same is preferably done with respect to the person. In the case of the person, it is generally not possible to assume a planned trajectory for the person, since firstly the intention of the person is not necessarily known and the movement sequences of the person can also often be controlled unintentionally, in particular, by reflex. Instead, a current pose of the person and/or a movement of the person (in particular, speed/acceleration) is preferably acquired, in particular, by a camera, and a possible future pose of the person is inferred from the current pose and/or the current movement of the person.

In the case of a currently recognized contact event, no prediction or simulation is necessary, since a current contact event can also be carried out via a common collision detection, for example, by determining an external force screw based on the joint torque vector detected in the joints by torque sensors of the robot manipulator.

Regardless of the type of detection of a current or future contact event, such a detection also provides information about which of the body zones on the person defined in the database is or will be affected by the contact event. Since each of the body zones is assigned its own individual maximum permissible value of contact pressure according to the information in the database, a maximum permissible contact pressure that may result from the contact event is also known depending on the location of the contact event of the robot manipulator with the person's body.

This is taken into account according to the invention. A reference position is defined for this purpose, which is fixedly arranged relative to the person's body, in particular, to the surface of the person's body. This body-fixed reference position therefore naturally corresponds to the location on the person's surface at which the person can feel the contact of the robot manipulator. In the further course of the movement of the robot manipulator with a non-zero normal component of the movement in relation to the surface of the person's body, a pushing in (depression) of the tissue of the person occurs, which the person perceives as contact pressure. The tissue of the person is naturally viscously damping and also at least partially elastically resilient (and under certain circumstances at least temporarily plastic in parts without this representing a permanent, irreversible deformation of the tissue that causes injury).

According to the invention, the robot manipulator is controlled in an impedance-regulated manner at least from the start of the local (spatial) progression of the pushing in (depression) of the tissue of the person during the contact event. Thus, on the one hand, the person's tissue has elastic elements, and on the other hand, the impedance regulation of the robot manipulator includes an artificial spring component, which, starting from the reference point at least in the component normal to the surface of the person's body, builds up an increasing restoring force and thus reduces the kinetic energy at least in the direction of this normal component.

In this case, the impedance regulation is carried out, in particular, based on the relative position between the reference position and a predefined location on the robot manipulator. The value of the length of this position vector determines, in particular, the deflection through which a deflection-dependent resistance force is generated with the aid of the artificial spring component.

The impedance regulation is preferably carried out based on a relative position determined using two channels, starting from the current position of a location on the robot manipulator relative to the reference position on the person. The two-channel nature is obtained, in particular, by a robot-specific set of sensors, including, in particular, joint angle sensors, on the one hand and an external sensor unit, preferably a camera unit. Also, two or more camera units can be used. Such a two-channel system leads, in particular, to the position information being obtained from at least two sources, which are then checked for data consistency, in particular, by a comparison unit. If there is an inconsistency between the two sources, then at least one of the sensor units is faulty and safe operation of the robot manipulator can no longer be guaranteed. In such a case, a warning is preferably issued and/or the operation of the robot manipulator is stopped immediately.

The reference position preferably serves as a radially symmetrical zero position for the impedance regulation, in particular, for the artificial spring component of the impedance regulation. In this case, the impedance regulation treats any deflection from the zero position equally, regardless of the direction of the deflection. As an alternative, the impedance regulation is preferably carried out as a function of the direction, starting from the reference position as the zero position, in particular, the artificial spring component of the impedance regulation. The artificial spring component of the impedance regulation is preferably only applied for one direction which is normal, i.e., at right angles, relative to the surface of the affected body zone of the person, with the nominal regulation preferably being applied in other directions distinct from the normal component, which nominal regulation was used by the robot manipulator before applying the impedance regulation until reaching the reference position. On the one hand, this can be an impedance regulation itself, and on the other hand, it can be a force control, a position control, an admittance control, or other forms of control known in the prior art.

In addition to the artificial spring component, the impedance regulation of the robot manipulator preferably also includes an artificial damping component, which by definition naturally generates a speed-dependent resistance force.

In addition, according to the invention, the force (/pressure) exerted by the robot manipulator on the person is limited so that the maximum permissible value of the contact pressure for the body zone affected by the contact event is not exceeded. This takes place, in particular, within the possibilities of the bandwidth of the actuators of the robot manipulator, which is typically sufficiently high to ensure such a reaction with sufficient rapidity.

It is therefore an advantageous effect of the invention that in the event of contact between a robot manipulator and a person, the movement of the robot manipulator is reduced in a resilient and, in particular, damped manner, so that the person only feels a soft impact in the event of an impulse transmission. Limiting the contact pressure from the robot manipulator itself also advantageously avoids injuries. On the other hand, if the robot manipulator has no kinetic energy, but instead the momentum is transmitted due to the kinetic energy of the person, the same effect as described above is present, except that the robot manipulator is deflected in the opposite direction from its zero position of the impedance regulation, wherein the resilient and, in particular, also damping nature of the impulse transmission is preserved. Even with quasi-static power transmissions between the person and the robot manipulator, a subjectively soft contact with the robot manipulator is advantageously provided to the person, since the impedance regulation entails a deflection-dependent resistance starting from the reference position on the surface of the person's body.

According to an advantageous embodiment, the method also includes:

determining an edge geometry of that location on the robot manipulator that comes into contact with the person, wherein the maximum permissible contact pressure is determined or adjusted depending on the determined edge geometry.

The database preferably has a set of values for each of the body zones, with each of the elements from the set of values being assigned to a specific edge geometry or at least approximately to the edge geometry of that location on the robot manipulator that comes into contact with the person. Advantageously, not only the sensitivity of a body zone of the person is taken into account, but also the sensitivity in relation to an edge geometry that comes into contact with the body zone. Thus, by their very nature, thin, sharp, contours are more prone to causing injury even when the contact pressure is not increased in contrast to a contact event caused by a blunt surface. As an alternative to the set of values in the database, a fixed value for each body zone from the database is adjusted depending on the determined edge geometry. This is preferably done by multiplying by a factor reflecting the inverse sharpness of the edge geometry, such that a sharper edge is associated with a higher real contact pressure versus a constant maximum allowable contact pressure.

According to a further advantageous embodiment, when the impedance regulation is carried out up to the maximum permissible contact pressure, the maximum permissible contact pressure is determined or reduced as a function of a speed of the location of the robot manipulator that comes into contact with the person relative to the person. This embodiment advantageously takes account of the fact that rapid movements in which a person's tissue is pressed in are felt to be more unpleasant than slow ones. Therefore, analogously to the previous embodiment, instead of an edge geometry, the speed is taken into account in the event of a contact event between the robot manipulator and the person. Again, various entries can be present in the database which, according to this embodiment, applies to a finite set of speeds or is approximated to them. As an alternative to this, the single database entry in each case is adjusted accordingly, in particular, by a factor or another function.

According to a further advantageous embodiment, the impedance-regulated control of the robot manipulator is carried out in such a way that a predetermined braking distance is not exceeded when the tissue of the person is being pushed in (depressed). The braking distance is, in particular, dependent on the impulse transmission between the robot manipulator and the tissue of the person and correlates with an indentation depth of the robot manipulator on the tissue of the person. According to the limit of the braking distance, it is ensured that the tissue of the person is not pushed in beyond the specified limit. This is done, in particular, by appropriate control of the actuators of the robot manipulator, so that the robot manipulator performs a retraction movement when the limit value is reached.

According to a further advantageous embodiment, the specified braking distance is determined by a prediction at which distance from the reference position the maximum permissible contact pressure will be reached during the progression of the pushing in of tissue of the person. The contact pressure actually exerted therefore advantageously corresponds to the maximum permissible contact pressure and at the same time correlates with the limit value in the braking distance, so that a behavior of the robot manipulator that appears as natural as possible for the person is utilized in the entire permissible range.

According to a further advantageous embodiment, the impedance-regulated control of the robot manipulator is carried out by an impedance regulation with respect to a fixed coordinate system, so that the relative position vector between the location on the robot manipulator that comes into contact with the person and the current reference position on the person is determined as a connection vector in the fixed coordinate system. The earth-fixed coordinate system is in particular a Cartesian coordinate system.

According to an advantageous embodiment, the method also includes:
determining a degree of hardness and/or a modulus of elasticity of that location on the robot manipulator that comes into contact with the person, the maximum permissible contact pressure being determined or adjusted depending on the determined degree of hardness and/or modulus of elasticity.

The degree of hardness determines a resistance to penetration by a body and is preferably specified in Vickers units. The modulus of elasticity, on the other hand, describes a stress constant that indicates a degree of elongation under stress which occurs in the material of the robot manipulator. According to this embodiment, this material property or material properties of the location of the robot manipulator that comes/come into contact with the person is/are advantageously considered either via a value set of data in the database or by adapting a respective valid value from the database, in particular, by multiplying by a factor or another function, because the material property/properties has/have a significant influence on how the contact event is subjectively perceived by the person.

According to an advantageous embodiment, the method also has the following step:
determining a temperature of the component with that location on the robot manipulator that comes into contact with the person, with the maximum permissible contact pressure being determined or adjusted depending on the determined temperature.

The temperature of the component at that location of the robot manipulator that comes into contact with the person also has a corresponding influence on the person's subjective perception of the contact event with the robot manipulator. At extreme temperatures, the person perceives the contact event as rather unpleasant. Again, different values can be stored in the database for a respective body zone for different temperatures, or the individual value of the database for each body zone is adjusted accordingly.

According to a further advantageous embodiment, the impedance regulation has a non-linear artificial spring component, so that as the deflection increases, a counter-force that increases disproportionately with the deflection acts on the robot manipulator. Since human tissue, in particular, also has nonlinear mechanical properties (e.g., blood is a non-Newtonian fluid and the resistance when pushing on tissue suddenly increases when tendons and/or bones and/or ligaments are hit), this property of a person's body is also reflected, in particular, by the impedance regulation. As a result, the behavior of the robot manipulator in the event of a contact event is advantageously perceived as significantly more pleasant by the person.

A further aspect of the invention relates to a control unit to control a robot manipulator, the control unit including an interface to a database containing body zones of a person, each of the body zones being assigned a respective maximum permissible value of contact pressure, and a computing unit configured to:
determine a current or a future contact event of the robot manipulator with the person, and to determine a body zone of the person that is contacted;
determine a reference position fixed relative to a body of the person, wherein the reference position indicates beginning of a spatial progression of depression of a tissue of the person during the contact event with the person; and
control the robot manipulator in an impedance-regulated manner, such that the reference position serves as the zero position of an artificial spring component of impedance regulation of the robot manipulator, and a maximum permissible contact pressure is not exceeded as a limit value.

Advantages and preferred refinements of the proposed control unit result from an analogous and corresponding transfer of the statements made above in conjunction with the proposed method.

Further advantages, features, and details will be apparent from the following description, in which—with reference to the drawings, if necessary—at least one example embodiment is described in detail. The same, similar, and/or functionally identical parts are provided with the same reference numerals.

DETAILED DESCRIPTION

Figure 1:
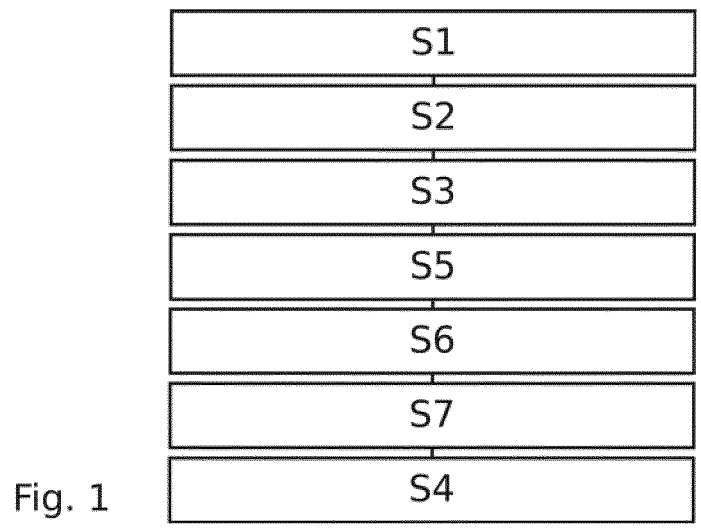
FIG. 1 shows a method of controlling a robot manipulator according to an example embodiment of the invention.

FIG. 1 shows a method for controlling a robot manipulator 1. The method is executed on a control unit 3. The steps shown in the following can therefore also be transferred to FIG. 2 and the reference symbols of FIG. 2 can also be used. The method includes the following operations:
providing S1 a database containing body zones of a person, wherein each of the body zones is assigned a respective maximum permissible value of contact pressure;
determining S2 a current or a future contact event involving the robot manipulator 1 and the person, and determining the contacted body zone of the person;

determining S3 a reference position which is fixed relative to the body of the person, wherein the reference position indicates the beginning of the spatial progression of the pushing-in (depression) of tissue of the person during the contact event with the person;

determining S5 an edge geometry of that location on the robot manipulator that comes into contact with the person, wherein the maximum permissible contact pressure is determined or adjusted depending on the determined edge geometry;

determining S6 a degree of hardness and/or a modulus of elasticity of that location on the robot manipulator that comes into contact with the person, the maximum permissible contact pressure being determined or adjusted depending on the determined degree of hardness and/or modulus of elasticity;

determining S7 a temperature of the component with that location on the robot manipulator that comes into contact with the person, with the maximum permissible contact pressure being determined or adjusted depending on the determined temperature; and impedance-regulated controlling S4 the robot manipulator 1 in such a way that the determined reference position is used as a zero position of an artificial spring component of the impedance regulation of the robot manipulator 1 and the maximum permissible contact pressure as a limit value is not exceeded.

Figure 2:
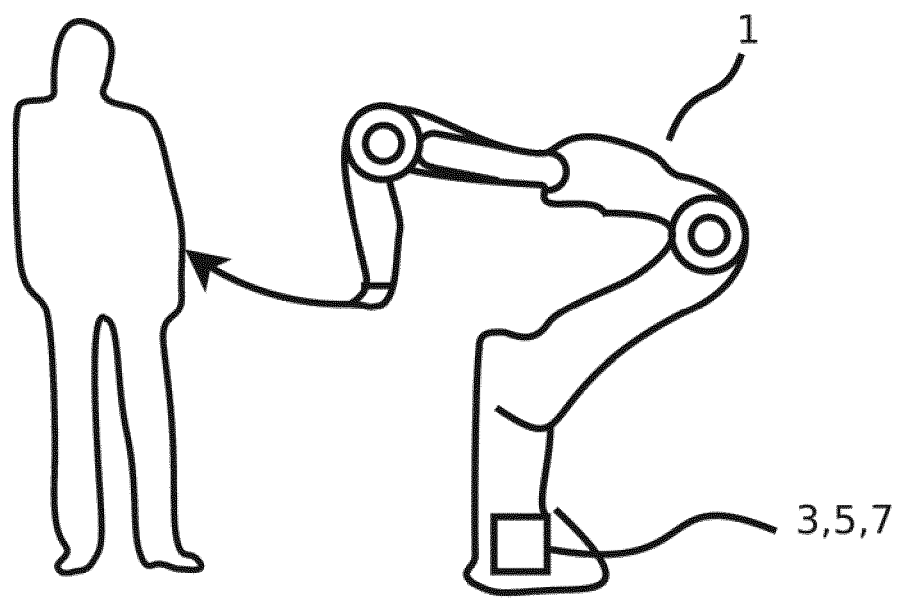
FIG. 2 shows a control unit to carry out the method according to FIG. 1.
The illustrations in the figures are schematic and not to scale.

FIG. 2 shows a control unit 3 to control a robot manipulator 1, having an interface 5 to a database with body zones of a person, each of the body zones being assigned a respective maximum permissible value of contact pressure, and a computing unit 7, wherein the computing unit 7 is used to determine a current or future contact event of the robot manipulator 1 with the person and to determine the contacted body zone of the person. The computing unit 7 also determines a reference position which is fixed relative to the body of the person, wherein the reference position indicates the beginning of the spatial progression of the pushing-in (depression) of tissue of the person during the contact event with the person. This is done by simulating the future movement sequences by extrapolating the current movement sequences of both the person and the robot manipulator 1. In addition, the computing unit 7 controls the robot manipulator 1 with impedance regulation in such a way that the reference position determined serves as the zero position of an artificial spring component of the impedance regulation of the robot manipulator 1 and the maximum permissible contact pressure as a limiting value is not exceeded.

Although the invention has been illustrated and described in detail by way of preferred example embodiments, the invention is not limited by the disclosed examples, and other variations can be derived therefrom by a person skilled in the art without departing from the scope of protection of the invention. It is therefore clear that several possible variations exist. It is also clear that the illustrated embodiments are really only examples, which are not to be construed in any way as limiting the scope of protection, the applicability, or the configuration of the invention. Rather, the foregoing description and the description of the figures enable a person skilled in the art to concretely implement the example embodiments, and such person may make various changes based on the knowledge of the disclosed inventive concept, for example with respect to the function or arrangement of individual elements cited in an example embodiment, without departing from the scope as defined by the claims and their legal equivalents, such as a more extensive explanation in the description.

LIST OF REFERENCE NUMERALS

1 robot manipulator
3 control unit
5 interface
7 computing unit
S1 providing
S2 determining
S3 determining
S4 controlling
S5 determining
S6 determining
S7 determining

What is claimed is:

1. A method of controlling a robot manipulator, the method comprising:
    providing a database containing body zones of a person, wherein each of the body zones is assigned a respective maximum permissible value of contact pressure;
    determining a current or a future contact event of the robot manipulator involving the person, and determining a body zone of the person that is contacted;
    determining a reference position fixed relative to a body of the person, wherein the reference position indicates beginning of a spatial progression of depression of a tissue of the person during the contact event with the person; and
    controlling the robot manipulator in an impedance-regulated manner, such that the reference position serves as a zero position of an artificial spring component of impedance regulation of the robot manipulator and a maximum permissible contact pressure is not exceeded as a limit value.

2. The method of claim 1, further comprising:
    determining an edge geometry of a location on the robot manipulator coming into contact with the person; and
    determining or adjusting the maximum permissible contact pressure depending on the edge geometry.

3. The method of any of claim 1, wherein when the controlling in the impedance-regulated manner is carried out up to the maximum permissible contact pressure, the method comprises determining or reducing the maximum permissible contact pressure as a function of a speed of the location of the robot manipulator coming into contact with the person relative to the person.

4. The method of claim 1, wherein the controlling in the impedance-regulated manner takes place such that a predetermined braking distance is not exceeded, when the tissue of the person is being depressed.

5. The method of claim 4, wherein the method comprises determining the specified braking distance by a prediction of a distance from the reference position at which the maximum permissible contact pressure will be reached during the progression of the depression of the tissue of the person.

6. The method of claim 1, wherein the controlling in the impedance-regulated manner is carried out by impedance regulation with respect to an earth-fixed coordinate system, such that a relative position vector between the location on the robot manipulator coming into contact with the person and the current reference position on the person is determined as a connection vector in the earth-fixed coordinate system.

7. The method of claim 1, further comprising:
    determining a degree of hardness and/or a modulus of elasticity of the location on the robot manipulator coming into contact with the person; and determining or adjusting the maximum permissible contact pressure depending on the degree of hardness and/or modulus of elasticity.

8. The method of claim 1, further comprising:
determining a temperature of a component with the location on the robot manipulator coming into contact with the person; and
determining or adjusting the maximum permissible contact pressure depending on the temperature.

9. The method of claim 1, wherein the controlling in the impedance-regulated manner has a non-linear artificial spring component, such that with increasing deflection, a counterforce that increases disproportionately with the deflection acts on the robot manipulator.

10. A control unit to control a robot manipulator, the control unit comprising:
an interface to a database containing body zones of a person, wherein each of the body zones is assigned a respective maximum permissible value of contact pressure value; and
a computing unit configured to:
determine a current or a future contact event of the robot manipulator with the person, and to determine a body zone of the person that is contacted;
determine a reference position fixed relative to a body of the person, wherein the reference position indicates beginning of a spatial progression of depression of a tissue of the person during the contact event with the person; and
control the robot manipulator in an impedance-regulated manner, such that the reference position serves as the zero position of an artificial spring component of impedance regulation of the robot manipulator and a maximum permissible contact pressure is not exceeded as a limit value.

11. The control unit of claim 10, wherein the computing unit is further configured to:
determine an edge geometry of a location on the robot manipulator coming into contact with the person; and
determine or adjust the maximum permissible contact pressure depending on the edge geometry.

12. The control unit of claim 10, wherein when the control in the impedance-regulated manner is carried out up to the maximum permissible contact pressure, the computing unit is further configured to determine or reduce the maximum permissible contact pressure as a function of a speed of the location of the robot manipulator coming into contact with the person relative to the person.

13. The control unit of claim 10, wherein the control in the impedance-regulated manner takes place such that a predetermined braking distance is not exceeded, when the tissue of the person is being depressed.

14. The control unit of claim 13, wherein the computing unit is further configured to determine the specified braking distance by a prediction of a distance from the reference position at which the maximum permissible contact pressure will be reached during the progression of the depression of the tissue of the person.

15. The control unit of claim 10, wherein the control in the impedance-regulated manner is carried out by impedance regulation with respect to an earth-fixed coordinate system, such that a relative position vector between the location on the robot manipulator coming into contact with the person and the current reference position on the person is determined as a connection vector in the earth-fixed coordinate system.

16. The control unit of claim 10, wherein the computing unit is further configured to:
determine a degree of hardness and/or a modulus of elasticity of the location on the robot manipulator coming into contact with the person; and
determine or adjust the maximum permissible contact pressure depending on the degree of hardness and/or modulus of elasticity.

17. The control unit of claim 10, wherein the computing unit is further configured to:
determine a temperature of a component with the location on the robot manipulator coming into contact with the person; and
determine or adjust the maximum permissible contact pressure depending on the temperature.

18. The control unit of claim 10, wherein the control in the impedance-regulated manner has a non-linear artificial spring component, such that with increasing deflection, a counterforce that increases disproportionately with the deflection acts on the robot manipulator.

* * * * *